US008573246B2

(12) United States Patent
Lv et al.

(10) Patent No.: US 8,573,246 B2
(45) Date of Patent: Nov. 5, 2013

(54) AUTOMATIC FILLING TERMINATION DEVICE AND CRYOGENIC VESSEL WITH THE SAME

(75) Inventors: Guoquan Lv, Jiangsu (CN); Minghua Deng, Jiangsu (CN); Pingan Jiang, Jiangsu (CN); Kun Wang, Jiangsu (CN)

(73) Assignees: Nantong CIMC Tank Equipment Co., Ltd., Jiangsu (CN); China International Marine Containers (Group) Co., Ltd., Shenzhen, Guangdong (CN)

( * ) Notice: Subject to any disclaimer, the term of this patent is extended or adjusted under 35 U.S.C. 154(b) by 874 days.

(21) Appl. No.: 12/622,580

(22) Filed: Nov. 20, 2009

(65) Prior Publication Data

US 2010/0288774 A1 Nov. 18, 2010

(30) Foreign Application Priority Data

May 12, 2009 (CN) .......................... 2009 1 0084016
May 12, 2009 (CN) ...................... 2009 2 0108011 U

(51) Int. Cl.
*F16K 31/18* (2006.01)

(52) U.S. Cl.
USPC ............. 137/433; 137/425; 137/582; 62/50.7

(58) Field of Classification Search
USPC ......... 137/409, 424, 425, 429, 430, 431, 433, 137/582; 141/198, 199, 204, 206, 212, 216; 62/50.1, 50.7
See application file for complete search history.

(56) References Cited

U.S. PATENT DOCUMENTS

| | | | | |
|---|---|---|---|---|
| 839,147 | A * | 12/1906 | Hollaender | 137/433 |
| 1,161,745 | A * | 11/1915 | Sprigman | 137/425 |
| 2,022,443 | A * | 11/1935 | Stollberg | 137/390 |
| 2,376,628 | A * | 5/1945 | Shanley | 62/50.7 |
| 2,485,689 | A * | 10/1949 | Baumann | 159/23 |
| 2,691,386 | A * | 10/1954 | Madison | 137/400 |
| 2,935,081 | A * | 5/1960 | Kryzer | 137/391 |
| 3,537,271 | A * | 11/1970 | Montag | 62/49.2 |
| 4,342,328 | A * | 8/1982 | Matta | 137/135 |
| 4,518,005 | A * | 5/1985 | Allewitz | 137/207 |
| 4,592,205 | A * | 6/1986 | Brodbeck et al. | 62/49.2 |
| 5,169,031 | A * | 12/1992 | Miller | 222/146.5 |
| 5,348,041 | A * | 9/1994 | Clark | 137/172 |
| 5,829,465 | A * | 11/1998 | Garretson | 137/2 |
| 2012/0090334 | A1* | 4/2012 | Harper et al. | 62/48.1 |

* cited by examiner

*Primary Examiner* — John Rivell
*Assistant Examiner* — Matthew W Jellett
(74) *Attorney, Agent, or Firm* — Greer, Burns & Crain, Ltd.

(57) ABSTRACT

An automatic filling termination device and a cryogenic vessel are provided including a body with a chamber, defined in the cryogenic vessel and provided with an inlet, communicated with the inlet for filling cryogenic medium into the chamber, and an outlet, arranged on the top wall of the body for discharging the cryogenic medium in the chamber into the cryogenic vessel; a flow termination member blocking the outlet, defined in the chamber of the body and has a predetermined weight to not be floated in the cryogenic medium; a floater, located outside the body and moving up and down when the liquid level of the cryogenic medium as filled into the cryogenic vessel is changed; and a connection, penetrated through the outlet to connect the flow termination member with the floater, wherein the outlet internal diameter is greater than the connection outer diameter by a predetermined dimension.

19 Claims, 3 Drawing Sheets

AUTOMATIC FILLING TERMINATION DEVICE AND CRYOGENIC VESSEL WITH THE SAME

FIELD OF THE INVENTION

The invention generally relates to a cryogenic vessel for storing cryogenic fluid. More particularly, it relates to an automatic filling termination device for the cryogenic vessel and the cryogenic vessel with the automatic filling termination device.

BACKGROUND OF THE INVENTION

Cryogenic mediums, such as liquid oxygen, liquid nitrogen, liquid argon, liquefied natural gas (LNG), etc., are materials commonly used in industry. They have lower working temperatures and are usually stored in cryogenic vessels in liquid form. For example, the working temperature of liquid nitrogen is generally around −196° C. In the course of filling a cryogenic liquid medium from a bulk supply tank into a cryogenic vessel, the medium will vaporize continuously, resulting in pressure in the vessel rising. Such pressure rising causes the pressure difference between the bulk supply tank and the inside of the vessel, decreasing or even vanishing, so that the filling process cannot continue. Moreover, the over-high pressure in the vessel will hide some safety troubles.

Hence, filling with gas-let-out is usually adopted. As shown in FIG. 1, an existing cryogenic vessel 1 is usually provided with an inlet pipe 2 and an exhaust pipe 3. During the filling process, liquid or liquefied medium is filled into the vessel through the inlet pipe 2 while the vapor of the medium exhausts through the exhaust pipe 3 to reduce the pressure within the vessel, so as to maintain a stable pressure difference between the bulk supply tank and the inside of the vessel. In this way, however, some medium will be wasted in vapor form.

In practice, the cryogenic medium stored in a cryogenic vessel is usually in a gas-liquid equilibrium state. Thus, the filling rate of liquid within the vessel needs to be controlled during the filling process. In the prior art, an overflow pipe 4 is commonly arranged on the vessel 1. The overflow pipe 4 is opened during the filling process. When liquid begins to flow out from the overflow pipe 4, it means that the vessel reaches the designed filling rate. At this time, valves for the bulk supply tank and for pipe(s) on the vessel need to be respectively and manually turned off, so as to stop filling. In this way, however, some medium will be wasted in liquid form.

The cryogenic medium is usually obtained through various complicated processes, which consume a large amount of additional energy and money. In the existing filling manner, the medium discharged from the exhaust pipe 3 and the overflow pipe 4 will be wasted inevitably. Accordingly, not only the environment will be contaminated but also the resources will be wasted. Additionally, there will be hidden safety troubles if the wasted medium is not handled properly. Therefore, how to prevent the medium from being wasted during the filling process is a problem demanding prompt solution.

Furthermore, the existing filling manner requires operators to focus their attention on opening and closing the corresponding valves of pipes and pipelines in time. If, for example, the overflow pipe 4 is forgotten to be opened during the filling process, the liquid within the vessel might exceed the safe liquid level, thereby causing hazards, such as pressure holding, or even vessel explosion, etc.

SUMMARY OF THE INVENTION

An object of the present invention is to provide an automatic filling termination device for a cryogenic vessel, which can automatically terminate the filling process when a predetermined volume of the cryogenic medium in the vessel has been reached.

Another object of the present invention is to provide a cryogenic vessel to prevent the cryogenic medium from being wasted during filling process.

In order to achieve one of the above objects of the invention, an automatic filling termination device for a cryogenic vessel with an inlet pipe is provided. Said device comprises: a body with a chamber, defined in the cryogenic vessel and provided with an inlet opening communicated with the inlet pipe for filling cryogenic medium into the chamber, and an outlet opening arranged on the top wall of the body for discharging the cryogenic medium in the chamber into the cryogenic vessel; a flow termination member for blocking the outlet opening of the body, defined in the chamber of the body and has a predetermined weight so as not to be floated in the cryogenic medium; a floater, located outside the body and being capable of moving up and down when the liquid level of the cryogenic medium as filled into the cryogenic vessel is changed; and a connection, penetrated through the outlet opening of the body to connect the flow termination member with the floater, wherein the internal diameter of the outlet opening is greater than the outer diameter of the connection by a predetermined dimension.

The automatic filling termination device can further comprise a flow disturbing plate disposed between the outlet opening of the body and the floater. The connection penetrates through the flow disturbing plate via a through hole disposed thereon, wherein the internal diameter of the through hole is approximately equal to the outer diameter of the connection.

The flow disturbing plate can be configured into a curved shape so as to increase the splashing down area of the medium impact thereon.

Preferably, the flow disturbing plate can be configured into a shape of a spherical crown.

The flow disturbing plate can be located at a constant distance from the outlet opening of the body, so as to maintain the stability of the splashing.

The flow disturbing plate can be fixed to the inlet pipe of the cryogenic vessel.

The body of the automatic filling termination device can be fixed to an inner wall of the cryogenic vessel via at least one fixing member.

The flow disturbing plate can be fixed to said at least one fixing member.

The inner surface of the top wall of the body can be configured into a concave surface for matching the flow termination member so that the flow termination member can tightly close the outlet opening when the floater goes up with the liquid level of the cryogenic medium.

The flow termination member can be configured into a spherical shape.

The inlet opening can be arranged on the side wall of the body.

In order to achieve another object of the invention, a cryogenic vessel for storing a cryogenic medium is provided. Said cryogenic vessel is equipped with an inlet duct for filling the cryogenic medium thereinto. Said cryogenic vessel is further equipped with an automatic filling termination device comprising: a body with a chamber, defined in the cryogenic vessel and provided with an inlet opening, communicated with the inlet pipe for filling cryogenic medium into the chamber, and an outlet opening, arranged on the top wall of the body for discharging the cryogenic medium in the chamber into the cryogenic vessel; a flow termination member for blocking the outlet opening of the body, defined in the chamber of the body and has a predetermined weight so as not to be floated in the cryogenic medium; a floater, located outside the body and being capable of moving up and down when the liquid level of the cryogenic medium as filled into the cryogenic vessel is changed; and a connection, penetrated through the outlet opening of the body to connect the flow termination member with the floater, wherein the internal diameter of the outlet opening is greater than the outer diameter of the connection by a predetermined dimension. When the liquid or liquefied cryogenic medium within the cryogenic vessel reaches a predetermined liquid level, the floater floats upwardly and makes the flow termination member reach the top wall of the body and block the outlet opening.

The automatic filling termination device can be located at a position close to the top portion of the cryogenic vessel.

According to the present invention, the vessel can be filled without any medium discharging therefrom, i.e. realizing a non-loss filling, which can avoid the waste of the cryogenic medium and reduce the cost, and is of great advantage to the environment. By determining the mounting position of the automatic filling termination device through calculation, the volume of liquid filled into the vessel can be accurately controlled, so that the overfilling phenomenon and overpressure hazards (e.g. vessel explosion), which potentially exist in the prior art, can be completely avoided. When filling the medium into the cryogenic vessel of the present invention, there is no need to open the valves of the exhaust and overflow pipes, if such pipes are arranged. There is even no need to equip the exhaust pipe and/or the overflow pipe on the vessel. The automatic filling termination device according to the present invention can be particularly designed depending on actual demands, so as to meet the clients' requirements for different filling rates. In addition, the automatic filling termination device of the present invention has a very small size as comparing with the size of the vessel, so that it almost doesn't impact the loading volume of the vessel where it is arranged thereon.

In the following, the invention will be described in greater detail by way of exemplary embodiments in conjunction with the accompanying drawings.

DETAILED DESCRIPTION OF THE PREFERRED EMBODIMENT

Figure 1:
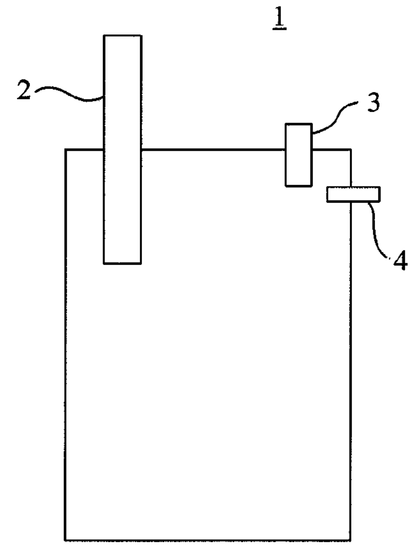
FIG. 1 is a schematic view showing the structure of an existing cryogenic vessel.
Figure 2:
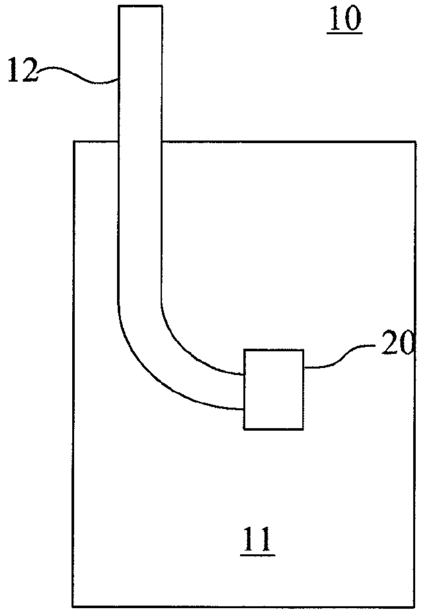
FIG. 2 is a schematic view showing the structure of a cryogenic vessel equipped with an automatic filling termination device according to the present invention.

FIG. 2 shows a cryogenic vessel 10 according to the present invention, which has a hollow inside 11 for storing a cryogenic medium. An inlet pipe 12 is arranged on the vessel 10 for filling the cryogenic medium into the inside 11 of the vessel therethrough. An automatic filling termination device 20 connected with the inlet pipe 12 is also provided in the vessel 10.

Figure 3:
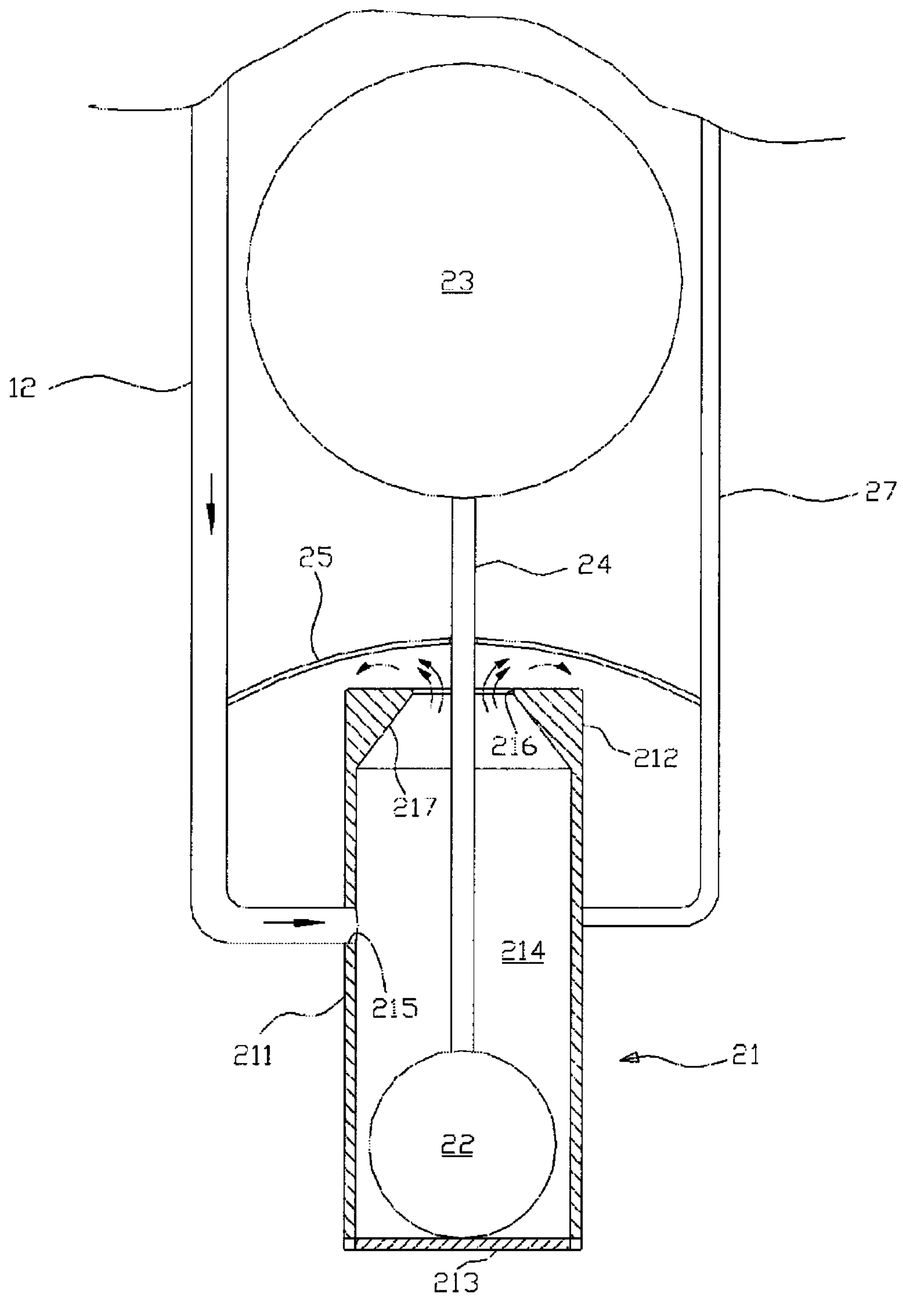
FIG. 3 is a view showing the structure of the automatic filling termination device in FIG. 2; wherein the outlet opening is open.
Figure 4:
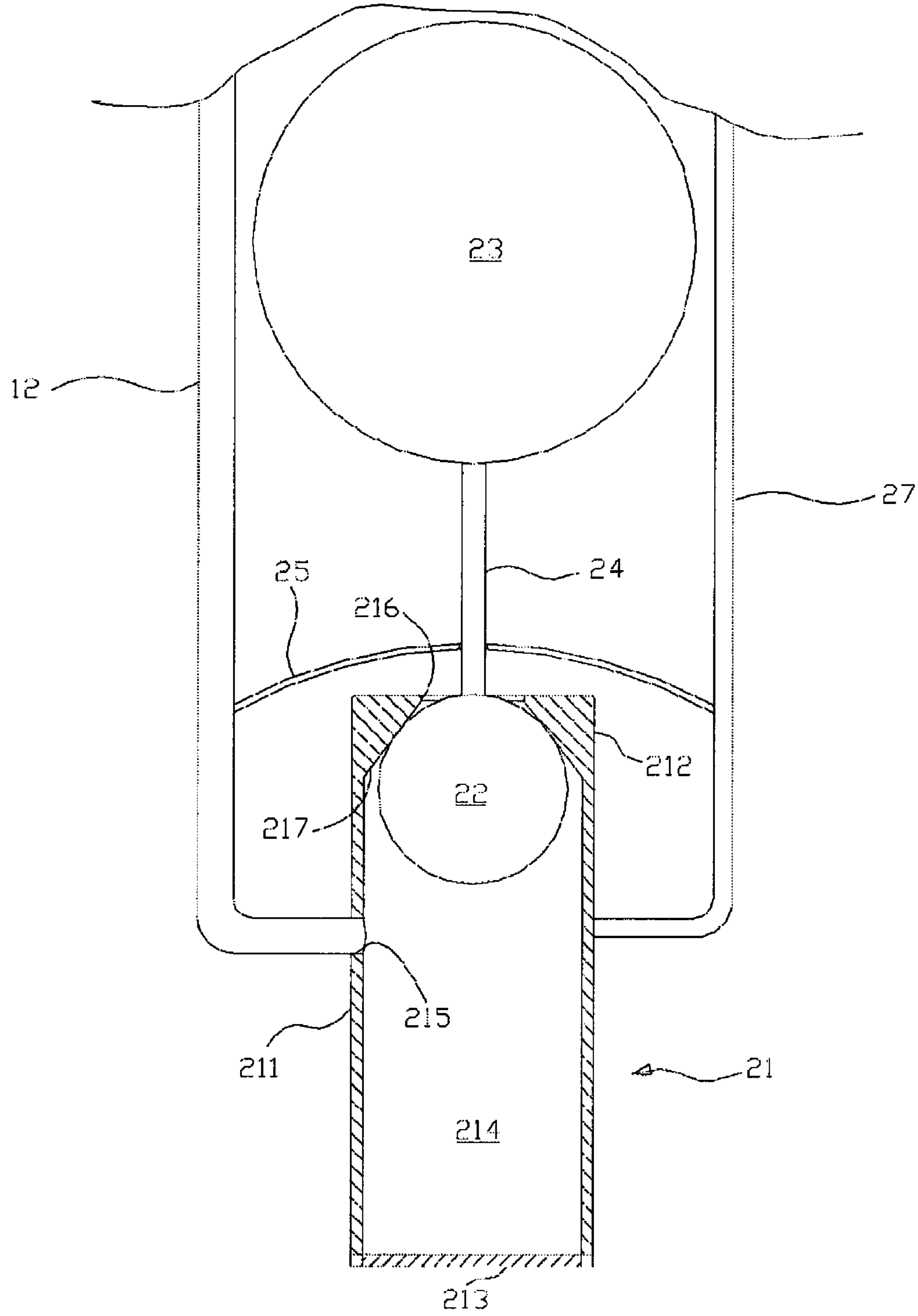
FIG. 4 is a view similar to FIG. 3, wherein the outlet opening is closed.

As shown in FIG. 3 and FIG. 4, the device 20 comprises a body 21 having a hollow inner chamber 214 enclosed by a side wall 211, a top wall 212 and a bottom wall 213. An inlet opening 215 communicated with the inlet pipe 12 is arranged on the body 21, e.g. on its side wall 211, while an outlet opening 216 communicated with the vessel inside 11 is arranged on the top wall 212 of the body, so that the closed inner chamber 214 can be communicated with the inlet pipe 12 and the vessel inside 11 via the inlet and the outlet openings 215 and 216, respectively. In this way, the cryogenic medium from the inlet pipe 12 can only be filled into the vessel inside 11 by successively passing through the inlet opening 215, the inner chamber 214 and the outlet opening 216. The arrows in FIG. 3 illustrate the direction of the medium flow from the inlet pipe 12 into the vessel inside 11.

As shown in FIGS. 3 and 4, the inlet opening 215 is arranged on the side wall 211 of the body 21. According to other possible embodiments of the invention, however, the inlet opening 215 can also be arranged at another position of the body 21, for example at a position on the top wall 212 which deviates from the outlet opening 216 by a distance. A flow termination member 22 for blocking the outlet opening 216 is arranged in the chamber 214. A floater 23 is disposed at the outside of the body 21. The flow termination member 22 and the floater 23 are fixedly connected with each other by means of a connection 24 passing through the outlet opening 216. The internal diameter of the outlet opening 216 is arranged to be greater than the outer diameter of the connection 24 by a predetermined size, so that the cryogenic medium in the chamber 214 can successfully leave said chamber via the outlet opening 216. It should be noted that the components and parts in the accompanying drawings are not drawn at their actual scales, particularly that the length of the connection 24 is diminished. The connection 24 can be of any suitable type and form, for example, a rigid rod, a flexible rope, or their combination.

The flow termination member 22 is designed and configured to have sufficient weight so that it cannot be floated in the cryogenic medium by itself. Thus, without other external force, the flow termination member 22 will stay at the bottom of the chamber 214, as shown in FIG. 3, and will not block the outlet opening 216 on the top wall 212 of the body, even when the inner chamber 214 is filled with the cryogenic medium. The floater 23 is designed and configured such that it can float on the cryogenic medium. Thereby, it can move up and down according to the height of liquid level of the cryogenic medium within the vessel. The flow termination member 22, the floater 23 and the connection 24 are properly sized and configured so that the flow termination member 22 connected to the floater 23 by the connection 24 can float upwardly with said floater 23, and will reach the top wall 212 of the body 21 and block the outlet opening 216 disposed thereon when the liquid or liquefied medium in the vessel reaches a predetermined liquid level, as shown in FIG. 4, thus cutting off the medium supply from the inner chamber 214 of body 21 to the vessel inside 11. When the outlet opening 216 has been blocked, the pressure in the inlet pipe 12 as well as in the inner chamber 214 of the body will rise up rapidly. Once such pressure rising is detected, for example by a pressure sensor, the bulk supply tank for supplying the cryogenic medium will automatically terminate the filling process for the vessel.

According to one embodiment of the invention, the inner surface of the top wall 212 of the body 21 can be shaped and configured to match the outer profile of the flow termination member 22, enabling the outlet opening 216 to be blocked and sealed by the flow termination member 22 more tightly. For example, the flow termination member 22 may have a spherical overall shape, and the inner surface of the top wall 212 may have a tapered concave surface 217 (see FIG. 3). The flow termination member 22 can also be designed into other suitable overall shape, such as cylindrical shape, plate-like shape, etc. Similarly, the floater 23 can be configured to have a shape of hollow sphere or hollow cylinder, or any other suitable shape.

Because the floater 23 is located right above the outlet opening 216, the cryogenic medium spurting out from the outlet opening 216, may impact the floater 23. Such impact may cause a false action of the flow termination member 22. In particular, due to such impact, the floater 23 may move upwardly before the predetermined level in the vessel 10 has been reached, pulling the flow termination member 22 to move upwardly with it and even block the opening 216. In order to solve this problem, a flow disturbing plate 25 is preferably disposed between the outlet opening 216 and the floater 23. The flow disturbing plate 25 is provided with a through hole, through which the connection 24 can pass. The internal diameter of the through hole is designed to be slightly greater than but approximately equal to the outer diameter of the connection 24, so as to reduce as much as possible the impacts of the cryogenic medium flow spurting out from the outlet opening 216 to the floater 23. In this way, the greater most of the cryogenic fluid spurting out from the outlet opening 216 will spurt onto the lower surface of the flow disturbing plate 25 and then splash down into the vessel inside, so that the positional stability of the floater 23 will not be affected. Preferably, the flow disturbing plate 25 is shaped to have a curved lower surface, such as a spherical-crowned or a paraboloidal surface, which is convex or concave towards the floater 23, so that the splashing down area of the medium into the vessel can be also increased. Preferably, the flow disturbing plate 25 can be located at a constant distance from the outlet opening 216, for example by fixing it to the inlet pipe 12 (see FIG. 3) and/or directly to the body 21, so as to maintain the stability of the splashing.

Preferably, the automatic filling termination device 20 of the present invention further comprises one or more fixing members 27, each of which is fixed to the body 21 at its one end and to the inner wall of the vessel 10 at its other end, so as to improve the stress condition between the liquid inlet pipe 12 and the body 21 of the automatic filling termination device 20. For example, the fixing members 27 can be fixed, preferably welded, to the head portion and/or cylinder portion of the inner wall of the vessel. According to practical requirement, the fixing members 27 can be configured into any suitable structure and shape. Preferably, all the fixing members 27 together with the liquid inlet pipe 12 can be arranged uniformly or symmetrically around the body 21. The flow disturbing plate 25 can be further fixed to the at least one fixing member 27. Alternatively, said plate 25 can be only fixed to one or more fixing members 27.

Preferably, all components and parts of the automatic filling termination device 20 according to the invention, such as the body 21, the flow termination member 22, the floater 23, the connection 24, the flow disturbing plate 25 and/or the fixing members 27, are made of cryogenic material, such as stainless steel.

The process of filling the cryogenic vessel 10 with cryogenic medium by using the automatic filling termination device 20 according to the present invention will now be described in detail.

In the beginning of the filling process, the flow termination member 22 is located at the bottom of the inner chamber 214 of the body 21 due to the action of gravity. During the filling, the liquid or liquefied cryogenic medium in the bulk supply tank (not shown) first flows into the inner chamber 214 of the body via the liquid inlet pipe 12 and the inlet opening 215, and then into the inside 11 of the vessel 10 via the outlet opening 216. Commonly, the cryogenic medium in the bulk supply tank has a greater pressure and a lower temperature than the pressure and the temperature within the vessel to be filled. Thus, the medium just spurting out from the outlet opening 216 has a lower temperature, too. The automatic filling termination device 20 is arranged preferably at a position close to the top of the vessel, so that the medium vapor gathering in the upper portion of the vessel inside 11 can be cooled or even re-liquefied through said medium just spurting out. In this way, the pressure in the vessel 10 is reduced effectively without exhausting any vapor through the exhaust pipe, so that the waste of the medium vapor is avoided. The splashing range of the medium spurting into the vessel inside can be optimized by properly sizing and configuring the flow disturbing plate 25, so as to better cool the medium vapor.

As the liquid level within the vessel 10 rises, the buoyancy force to the floater 23 by the liquid or liquefied medium is generated and gradually increased, so as to allowing the flow termination member 22 float upwardly in company with the floater 23 connected to the flow termination member 22 by the connector 24. When the liquid or liquefied medium inside the vessel arrives at the predetermined liquid level, the floater 23 floats upwardly to the very height that makes the flow termination member 22 reach the top of the inner chamber 214 of the body and block the outlet opening 216, as shown in FIG. 4. Then, the medium entering into the inner chamber 214 from the liquid inlet pipe 12 cannot flow out into the vessel inside 11 any more. In this way, during the filling process, there is no need to use the overflow pipe for detecting the volume of the liquid within the vessel, thereby no medium will be wasted.

Generally, the vaporing speed of the cryogenic medium is very fast. After the outlet opening 216 of the body 21 is blocked, the pressure within the liquid inlet pipe 12 and the inner chamber 214 rises rapidly, e.g. increasing about 2-5 bar per second. At the same time, the flow speed of the medium drops rapidly and even drops to zero. If detecting such sudden change in pressure and/or flow speed, a pressure gauge and/or a flow meter mounted in the filling pipelines connecting the bulk supply tank with the vessel will send a "cut-off" signal to a filling pump (not shown) supplying power to the bulk supply tank. Once the filling pump receives said "cut-off" signal, it stops. Thus, the entire filling process is automatically terminated. Of course, the automatic termination of the filling possess can also be realized by using other signals. It should be noted that, because the filling possess can be automatically terminated according to the present invention, there is no need to manually close the bulk supply tank. Therefore, the bulk supply tank can be placed far away from the vessel to be filled. Thus, the safety of the filling process is enhanced.

Filling a vessel of the prior art, which has no overfilling protective device, at a high pressure tends to bring on a hazard of overfilling. Moreover, because the filling process in the prior art is accompanied with the discharge of the cryogenic medium vapor, and there is a time interval between the observation of liquid flowing out from the overflow pipe and the manual operation of closing the related valves, it is not uneconomical in the prior art to fill at a high pressure. Therefore, the vessel in the prior art can be filled only by a lower filling speed, thus more filling time is needed. The cryogenic vessel equipped with the automatic filling termination device according to the invention can automatically and immediately terminate the filling operation when the predetermined liquid level is reached, thereby avoiding an overfilling phenomenon. Therefore, the vessel according to the present invention can be filled at a high pressure, so that rapid filling can be realized.

For instance, the cryogenic vessel with a capacity less than about 2000 L can be filled within about 3 to about 20 minutes.

According to the invention, the filling can be performed without discharging any medium from the vessel, that is, a non-loss filling can be realized. Therefore, both the exhaust pipe and the overflow pipe can be closed during the filling period. And even no exhaust pipe and/or overflow pipe needs to be provided on the vessel at all.

Although several preferred embodiments of the present invention have been described, the present invention may be used with other configurations. It will be appreciated by those skilled in the art that, the present invention could have many other embodiments, and changes and modifications may be made thereto without departing from the invention in its broader aspects and as set forth in the following claims and equivalents thereof.

What is claimed is:

1. An automatic filling termination device for a cryogenic vessel for storing cryogenic medium having a low working temperature, the cryogenic vessel having an inlet pipe the automatic filling termination device being provided within the cryogenic vessel and comprising a body with a chamber, defined in the cryogenic vessel and provided with an inlet opening, communicated with the inlet pipe for filling the cryogenic medium into the chamber, and an outlet opening, arranged on a top wall of the body for discharging the cryogenic medium in the chamber into the cryogenic vessel;

a flow termination member for blocking the outlet opening of the body, defined in the chamber of the body and has a predetermined weight so as not to be floated in the cryogenic medium;

a floater, located outside the body and being capable of moving up and down when the liquid level of the cryogenic medium as filled into the cryogenic vessel is changed;

a connection, penetrated through the outlet opening of the body to connect the flow termination member with the floater, wherein an internal diameter of the outlet opening is greater than an outer diameter of the connection by a predetermined dimension, and a flow disturbing plate, which is separate from said body and disposed between the outlet opening of the body and the floater so that the cryogenic medium spurting out from the outlet opening is spurt onto a lower surface of the flow disturbing plate and then splashes down directly into the vessel inside, wherein the connection penetrates through the flow disturbing plate via a through hole disposed on said flow disturbing plate, wherein the internal diameter of the through hole is approximately equal to the outer diameter of the connection;

wherein the automatic filling termination device is located at a position close to a top portion of the cryogenic vessel, so that at least part of the cryogenic medium vapor gathering in the upper portion of the cryogenic vessel is cooled and/or re-liquified by the cryogenic medium splashing down from the flow disturbing plate so as to reduce the pressure in the cryogenic vessel without exhausting any cryogenic medium vapor from the cryogenic vessel.

2. The automatic filling termination device of claim 1, wherein the flow disturbing plate is configured into a curved shape so as to optimize a splashing down area of the cryogenic medium splashing from the lower surface of the flow disturbing plate.

3. The automatic filling termination device of claim 2, wherein the flow disturbing plate is configured into a shape of a spherical crown.

4. The automatic filling termination device of claim 1, wherein the flow disturbing plate is located at a constant distance from the outlet opening of the body.

5. The automatic filling termination device of claim 4, wherein the flow disturbing plate is fixed to the inlet pipe of the cryogenic vessel.

6. The automatic filling termination device of claim 1, wherein the body is fixed to an inner wall of the cryogenic vessel via at least one fixing member.

7. The automatic filling termination device of claim 6, wherein the flow disturbing plate is fixed to said at least one fixing member.

8. The automatic filling termination device of claim 1, wherein the inner surface of the top wall of the body is configured into a concave surface for matching the flow termination member so that the flow termination member can tightly close the outlet opening when the floater goes up with the liquid level of the cryogenic medium.

9. The automatic filling termination device of claim 8, wherein the flow termination member is configured into a spherical shape.

10. The automatic filling termination device of claim 1, wherein the inlet opening is arranged on a side wall of the body.

11. A cryogenic vessel for storing cryogenic medium having a low working temperature, equipped with an inlet pipe for filling the cryogenic medium into said vessel, wherein an automatic filling termination device is provided within the cryogenic vessel, the cryogenic vessel comprising:

a body with a chamber, defined in the cryogenic vessel and provided with an inlet opening, communicated with the inlet pipe for filling cryogenic medium into the chamber, and an outlet opening, arranged on a top wall of the body for discharging the cryogenic medium in the chamber into the cryogenic vessel;

a flow termination member for blocking the outlet opening of the body, defined in the chamber of the body and has a predetermined weight so as not to be floated in the cryogenic medium;

a floater, located outside the body and being capable of moving up and down when the liquid level of the cryogenic medium as filled into the cryogenic vessel is changed;

a connection, penetrated through the outlet opening of the body to connect the flow termination member with the floater, wherein an internal diameter of the outlet opening is greater than an outer diameter of the connection by a predetermined dimension; and a flow disturbing plate, which is separate from said body and disposed between the outlet opening of the body and the floater so that the cryogenic medium spurting out from the outlet opening is spurt onto a lower surface of the flow disturbing plate and then splashes down directly into the vessel inside, wherein the connection penetrates through the flow disturbing plate via a through hole disposed on said flow disturbing plate, wherein the internal diameter of the through hole is approximately equal to the outer diameter of the connection, wherein when the liquid or liquefied cryogenic medium within the cryogenic vessel reaches a predetermined liquid level, the floater floats upwardly and makes the flow termination member reach the top wall of the body and block the outlet opening, wherein the automatic filling termination device is located at a position close to a top portion of the cryogenic vessel, so that at least part of the cryogenic medium vapor gathering in the upper portion of the cryogenic vessel is cooled and/or re-liquified by the cryogenic medium splashing down from the flow disturbing plate so as to reduce the pressure in the cryogenic vessel without exhausting any cryogenic medium vapor from the cryogenic vessel.

12. The cryogenic vessel of claim 11, wherein the flow disturbing plate is configured into a curved shape so as to optimize a splashing down area of the cryogenic medium splashing from the lower surface of the flow disturbing plate.

13. The cryogenic vessel of claim 11, wherein the flow disturbing plate is located at a constant distance from the outlet opening of the body.

14. The cryogenic vessel of claim 13, wherein the flow disturbing plate is fixed to the inlet pipe of the cryogenic vessel.

15. The cryogenic vessel of claim 11, wherein the flow disturbing plate is configured into a shape of a spherical crown.

16. The cryogenic vessel of claim 11, wherein the body of the automatic filling termination device is fixed to an inner wall of the cryogenic vessel via at least one fixing member, and wherein the flow disturbing plate is fixed to said at least one fixing member.

17. The cryogenic vessel of claim 11, wherein the inner surface of the top wall of the body is configured into a concave surface for matching the flow termination member so that the flow termination member can tightly close the outlet opening when the floater goes up with the liquid level of the cryogenic medium.

18. The cryogenic vessel of claim 17, wherein the flow termination member is configured into a spherical shape.

19. The cryogenic vessel of claim 11, wherein the inlet opening is arranged on a side wall of the body.

* * * * *